United States Patent [19]

Proske et al.

[11] Patent Number: 4,595,902
[45] Date of Patent: Jun. 17, 1986

[54] ANTI-THEFT APPARATUS FOR VEHICLES

[75] Inventors: Arnost Proske, Emmering; Walter Weishaupt, Munich, both of Fed. Rep. of Germany

[73] Assignee: Bayerische Motoren Werke A.G., Fed. Rep. of Germany

[21] Appl. No.: 452,031

[22] Filed: Dec. 22, 1982

[30] Foreign Application Priority Data

Nov. 5, 1982 [DE] Fed. Rep. of Germany ....... 3240945

[51] Int. Cl.⁴ .......................... B60R 25/00; G06F 7/04
[52] U.S. Cl. .................................. 340/63; 340/825.31; 455/1; 455/26
[58] Field of Search ...................................... 340/63–65, 340/825.72, 825.69, 825.31; 455/26–28, 1, 38, 90, 92; 343/18 E; 375/2.1, 2.2

[56] References Cited

U.S. PATENT DOCUMENTS

| 3,703,714 | 11/1972 | Andrews ............................ 340/539 |
| 3,760,422 | 9/1973 | Zimmer et al. ................. 340/825.69 |
| 3,879,709 | 4/1975 | Yukawa ........................ 340/825.69 |
| 4,104,694 | 8/1978 | Hargrove ...................... 340/825.31 |
| 4,106,006 | 8/1979 | Atkins ............................ 340/825.31 |
| 4,143,368 | 3/1979 | Route et al. .......................... 340/63 |
| 4,258,352 | 3/1981 | Lipschutz .............................. 340/53 |
| 4,307,400 | 12/1981 | Miley ................................. 343/18 E |
| 4,383,242 | 5/1983 | Sassover et al. ...................... 340/64 |
| 4,397,034 | 8/1983 | Cox et al. .............................. 455/26 |

FOREIGN PATENT DOCUMENTS 2437314  2/1976  Fed. Rep. of Germany .
2926304  1/1981  Fed. Rep. of Germany .

Primary Examiner—John W. Caldwell, Sr.
Assistant Examiner—Tyrone Queen
Attorney, Agent, or Firm—Craig & Burns

[57] ABSTRACT

In an anti-theft apparatus for vehicles with wireless transmission of the code signal, the latter is suitably overlapped outside of the vehicle by a secondary signal which is not to be received in or on the vehicle. This results in an effective protection against interception of the code signal.

10 Claims, 3 Drawing Figures

ANTI-THEFT APPARATUS FOR VEHICLES

The invention relates to an anti-theft apparatus for vehicles with a first transmitter for the wireless or contactless transmission of a code signal to a receiver located in or on the vehicle, said receiver enabling the use of the vehicle if the code signal agrees with a stored code signal, as disclosed in Unexamined West German Application No. 243 7 314. The transmission can be effected via electro-magnetic, acoustic, or optical means.

Heretofore, various methods have been proposed to afford protection against unauthorized use. One consideration is to enhance the protection by increasing the numer of code possibilities. For example, a large number of possibilities are provided so that it would take considerable time to try them all out. Another method is based on the fact that the transmitted code signal is inevitably diffused and, thus, could be intercepted outside of the vehicle as well. It was therefore proposed (Unexamined West German Application No. 292 6 304) that a jamming signal of the same kind as the code signal be superposed upon the latter. The signal received outside of the vehicle by an unauthorized person is identical to the signal at the site of the receiver in the vehicle and consists in superposing the code and jamming signals upon one another. Thus, this signal is identical to a signal sent by a single transmitter and the contents of which correspond to the contents of the code and jamming signals. Now, if this signal is accepted outside of the vehicle and is then directed towards the receiver in the vehicle, this signal is identical to the signal transmitted by the authorized user of the vehicle and will enable the unauthorized person to use the vehicle as well.

A third method, likewise disclosed in Unexamined West German Application No. 292 6 304, consists in reducing the scatter-band of the transmitter. Since, due to the physical characteristics of the transmitter, this decrease can never result in a point-type transmission beam, or a certain scatter-band is always present, interception of the code signal is possible in this instance as well. On the other hand, even with a point-type transmission beam, zeroing-in on the receiver would be well-nigh impossible and, thus, use of the anti-theft apparatus would be considerably more difficult.

The invention provides an effective protection against use of the anti-theft device by unauthorized persons.

The invention employs a second transmitter for a secondary signal of the same type but with an orientation different from that of the transmitter for the code signal so that, when the code-signal transmitter is aimed at the receiver, the secondary signal is not directionally aimed at and does not reach the receiver, or reaches it after being attentuated considerably.

The receiver receives only the code signal if the latter is properly oriented and directed to it. However, in the area around the vehicle, the code signal and the secondary signal become overlapped one upon each other. If this signal, which results from the overlapping of the two signals, is aimed at the receiver by an unauthorized person, this signal is different from the code signal and, thus, use of the vehicle is not possible.

The secondary signal can be formed in different ways. It can be a jamming signal. If the transmitted code consists, for example, for a succession of identical transmitted pulses with a sequence that varies with the code and with two predetermined intervals, then the jamming signal could, for example, consist of a succession of pulses with at least the same duration as the code signal and with the same pulse interval. The interval is the same as the smaller of the two intervals of the code-signal pulse train.

As an alternative to the jamming signal, the secondary signal can be another code signal which, when the transmitter for the (first) code signal is oriented to the associated (first) receiver, the second signal is oriented to and impinges upon a second receiver in or on a vehicle. Here again, outside of the vehicle, the two code signals overlap one another and can no longer be separated from one another, so that unauthorized acceptance of this overlapping of the two code signals prohibits its use of the vehicle.

The effectiveness of the secondary signal can be substantially improved by locating the second transmitter in or on the vehicle.

Through fixed mounting of the second transmitter it is possible, without further provisions, to cause it to transmit a secondary signal which does not reach the receiver, but reaches all other locations outside of the receiver. Thus, it is possible to completely cover with the secondary signal all areas outside of the receiver.

The second transmitter can be located at various locations in or on the vehicle. The site of the receiver is a particularly favorable location for the transmitter. In this manner, the requirement that the secondary signal be transmitted to all areas outside of the receiver can be satisfied elegantly.

The mode of operation of the second transmitter can also be chosen differently. One of these possibilities consists of activating the second transmitter continuously. On the other hand, from the energy point of view it is more advantageous to activate the second transmitter by means of the first transmitter. The second transmitter functions only if the first transmitter sends out its code signal. This offers the additional advantage that at locations other than the receiver either the overlapping of the code signal and the secondary signal, or the secondary signal alone, can only be received for a short period of time. Therefore, it is difficult to analyze the secondary signal. This analysis can be made even more difficult by modifying the secondary signal every time it is transmitted, in relation to the last transmission.

It is therefore an object of the invention to provide an effective protection against use of the anti-theft device by unauthorized persons, by means of a second transmitter for a secondary signal of the same type but with an orientation different from that of a first transmitter so that when the code-signal first transmitter is aimed at a receiver, the secondary signal is aimed away from and does not reach the latter, or reaches it after being attenuated considerably.

It is another object of the invention to provide an anti-theft apparatus for vehicles.

It is another object of the invention to provide an anti-theft apparatus for vehicles with a first transmitter for the transmission of a first code signal without wires or contacts to a first receiver located in or on the vehicle, said first receiver enabling use of the vehicle if the first code signal agrees with a stored first code signal, characterized by a second transmitter for a secondary signal of the same kind, the orientation of which is selected differently from that of the transmitter for the first code signal so that when the code-signal transmitter is oriented to the first receiver, the secondary signal is not oriented to and does not reach the first receiver, or reaches it after being attentuated considerably.

Another object of the invention is to provide an anti-theft apparatus for vehicles having first and second transmitters, the second transmitter transmitting a jamming signal.

It is another object of the invention to provide an anti-theft apparatus for vehicles having first and second transmitters wherein said transmitters transmit different first and second code signals.

It is another object of the invention to provide an anti-theft apparatus for vehicles having first and second transmitters located outside the vehicle and first and second receivers located at or on the vehicle for reception of signals from said transmitters.

It is another object of the invention to provide an anti-theft apparatus for vehicles with a first transmitter located remote from a vehicle and a second transmitter located at the site of the vehicle and having a receiver located at the site of the vehicle which activates the second transmitter.

These and other objects, features, and advantages of the present invention will become more apparent from the following description when taken in connection with the accompanying drawings which show, for the purposes of illustration only, different embodiments in accordance with the present invention, and wherein.

Figure 1:
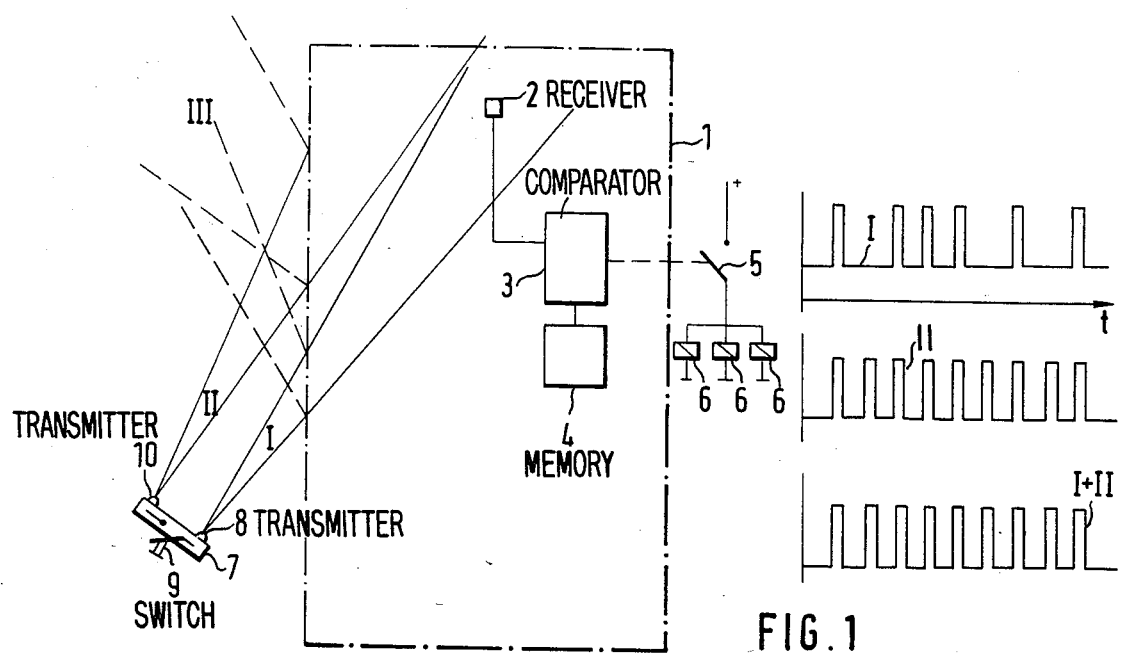
FIG. 1 shows an anti-theft device for vehicles which is protected against interception.

Referring to the drawings wherein like reference numerals represent like parts, FIG. 1 shows an anti-theft device for vehicles consisting of a receiver 2 mounted in the vehicle 1 and connected to a code comparator 3. This code comparator 3 is connected to a memory 4 for a stored code signal and controls a relay 6 by means of a schematically represented switch 5 to unlock or lock the doors or flaps of the vehicle.

The user of the vehicle, with the aid of a transmitting station having a transmission system 7, can send a code signal in the form of a radio, ultrasonic, or infrared signal. To do this as part of the station, a transmitter 8 is used which, upon activation of a switch 9, sends out a train of identical pulses. These pulses are sent out with two different intervals in accordance with the programmed code. Said a pulse train is schematically represented by I.

Transmission system 7 includes a transmitter 10 with which, upon actuation of switch 9, an identical jamming signal II is transmitted. This jamming signal consists of a train of pulses with the same duration and strength as the code signal I, and the interval of which equals the shorter of the two intervals for the pulses of the code signal I. Switch 9 activates transmitters 8 and 10 simultaneously.

While, with proper orientation of transmitter 8, in direct alignment to receiver 2, only the code signal I reaches the site of receiver 2 and, if it agrees with the code signal stored in code memory 4, results in the unlocking or locking of the vehicle by means of the comparator device 3. Consequently, the signal II which is aimed away from the receiver 2 will not be received by the receiver 2. Also a overlapping of signal I upon signal II (signal III) is created outside the vehicle, as shown by the dotted lines in FIG. 1, and thus a receiver located there cannot decipher only signal I. This overlapping is identical to the jamming signal II and consists of a train of identical pulses with the same interval. Therefore, for an unauthorized person the code signal I is not recognizable due to the overlapping of jamming signal II. If he directs at the receiver 2 the signal he has received, the jamming signal II on signal I, i.e., signal III with signal I, this signal is not identical to the stored signal and will therefore not be able to unlock the vehicle.

Figure 2:
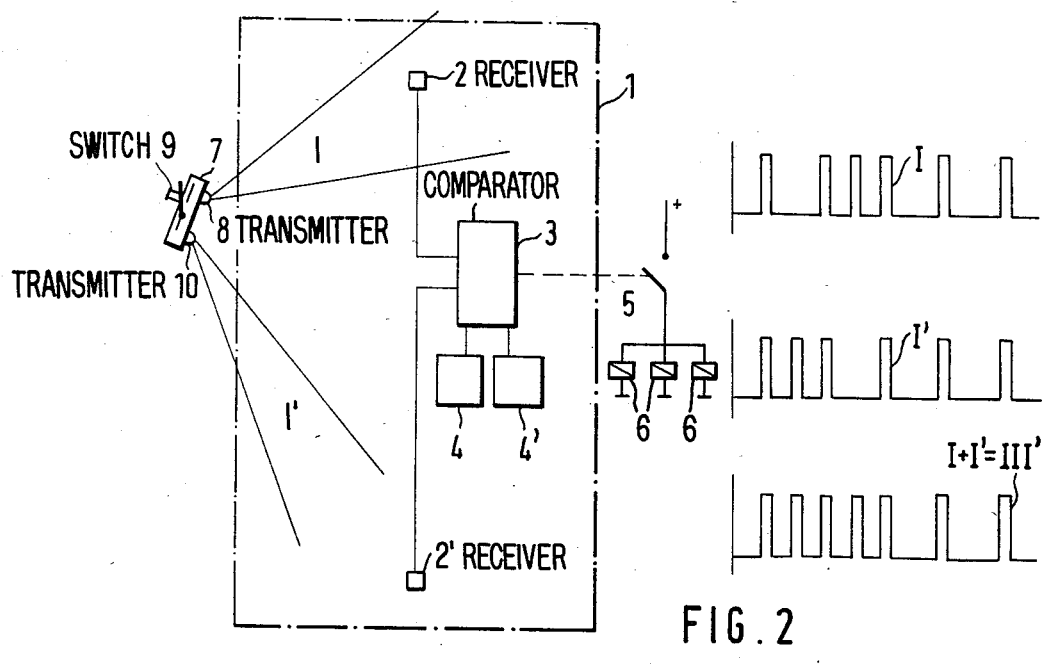
FIG. 2 shows an alternative to the device of FIG. 1, again in schematic form.

In the case of the apparatus represented schematically in FIG. 2, outside of the vehicle the code signal sent by transmitter 8 is overlapped with a secondary signal. In this case, the secondary signal is a second code signal, created by transmitter 10, with which a second receiver 2' is associated in addition to receiver 2 for the first code signal originating in transmitter 8, as well as a second code memory 4'. The orientation of both transmitters 8 and 10 is such that their transmitted code signals can be directed individually toward receivers 2 and 2', respectively, without an interfering overlapping. However, outside of the vehicle it leads to a overlapping or non-separation of the two code signals. Therefore, outside of the vehicle no distinction can be made between the two code signals, or the two signals cannot be received simultaneously at one location. Thus, use of the vehicle by an unauthorized person is not possible.

The second coded signal received from transmitter 10 is received by receiver 2' and compared with the second coded signal stored in memory 4'. When comparison of the signal received at receiver 2 with that in memory 4 correlates properly and the signal received at receiver 2', when compared with the signal stored in memory 4' correlates properly, comparator 3 serves to actuate switch 5 thereby actuating relays such as 6, as shown in FIG. 1, thereby unlocking the vehicle.

FIG. 1 is a schematic representation of the overlapping of the two code signals. For example, the two transmitters 8 and 10 send code signals as shown in the diagram and denoted by the reference numerals I and II. The overlapping of the code signals outside of the vehicle is indicated by the reference numeral III. Here again, it can readily be seen that the two code signals cannot be distinguished from each other.

Based on the consideration that it is impossible, in principle, to prevent the interception of the code signal transmitted without wires or contacts, the invention shows a surprisingly satisfactory way to render the intercepted signal valueless by making it different from the code signal or signals received in the vehicle.

Figure 3:
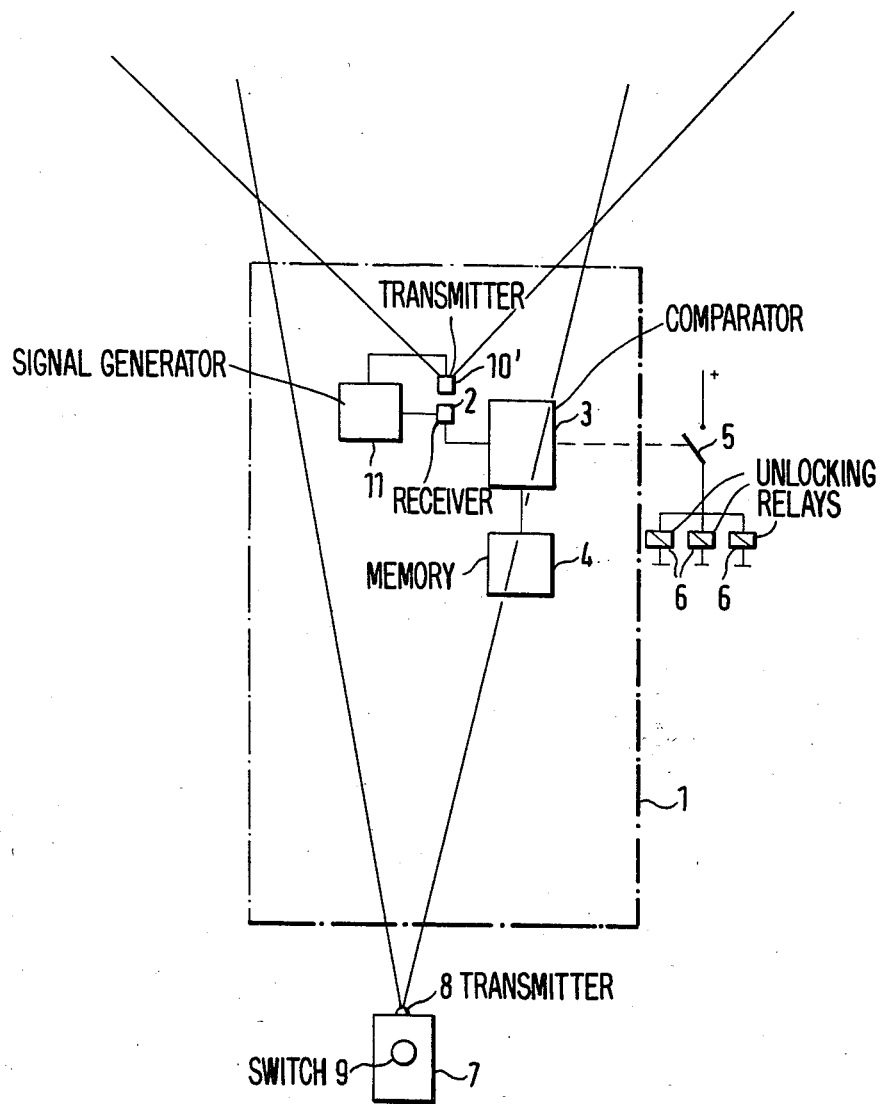
FIG. 3 shows another alternative to the device of FIG. 1.

In the specific embodiment shown in FIG. 3, a transmitter 10' is located at approximately the same site as the receiver 2, with which a jamming signal is transmitted simultaneously with the code signal. This jamming signal consists of a train of pulses with the same duration and strength as the code signal and the interval of which is selected to be the same as the shorter of the two intervals for the pulses of the code signal.

Transmitter 10' is activated by the code signal sent by transmitter 8. For this purpose, there is connected to receiver 2 a signal generator 11 which is activated by the appearance of the code signal and which drives transmitter 10' until the end of the code signal. The location of transmitter 10' relative to receiver 2 and its transmission range are chosen so that the jamming signals sent by transmitter 10' cannot reach receiver 2, but can reach any location outside of receiver 2. This is true because transmitter 10' is oriented to direct its signal in a direction away from the sensor and thus the signal from transmitter 8 will not be overlapped with the signal from transmitter 10' until after it has passed sensor 2. However, outside the vehicle, the signals will overlap each other.

Thus, either the jamming signal alone sent from transmitter 10' can be received outside of receiver 2 for a short period of time or, if within the transmission field of transmitter 8, the jamming signal overlapped with the code signal. Under no circumstances can the code signal transmitted by transmitter 8 be received alone outside of receiver 2, regardless of the location from which transmission system 7 sends the code signal. Therefore, it is not possible for an unauthorized person to intercept the code signal transmitted from transmitter 8 alone and then send it in order to use the vehicle.

Instead of sending the secondary signal only during the transmission of the code signal it is also possible, for example, to operate transmitter 10' continuously or run it at frequent short intervals independently of the transmission of the code signal. This has the advantage that the code signal, even if it does not reach receiver 2 and, in the case described above, activates transmitter 10', is overlapped with the jamming signal. Thus, overlapping of the code signal upon the jamming signal is independent of the accuracy of aim of the rightful vehicle user.

While we have shown and described several embodiments in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

We claim:

1. A anti-theft apparatus for vehicles having a lock means having a first transmitter, located outside of the vehicle, transmitting a first code signal without wires or contacts to a first receiver located in the vehicle, wherein comparator means in the vehicle is connected to the first receiver to actuate the lock means of the vehicle only if the first receiver senses a transmission of the first code signal which agrees with a code signal in said comparator means, a second transmitter transmitting a secondary signal of the same kind as the first code signal and which is actuated with said first transmitter, the second transmitter having a transmission orientation different from that of the transmitter for the first code signal so that, when the first code-signal transmitter is oriented to the first receiver, the secondary signal is not oriented to the first receiver and does not reach the first receiver or reaches it after being attenuated considerably or after being overlapped with said first signal, and wherein the comparator actuates the lock means of the vehicle only if the first transmitter is oriented to the first receiver so that the first receiver receives the first code signal as transmitted and will not actuate the lock means of the vehicle if the receiver receives the second signal or a signal caused by an overlapping of said first and second signals.

2. The apparatus according to claim 1, characterized in that the secondary signal is a jamming signal.

3. The apparatus according to claim 1, characterized in that the secondary signal is a code signal, of the same kind which, when the first transmitter for the first code signal is oriented to the associated first receiver, the second transmitter is oriented to and impinges its second signal upon a second receiver in the vehicle, and wherein the actuation of the lock means of the vehicle can only occur if both receivers receive their respective signals without overlapping by another signal.

4. The apparatus according to claim 1, characterized in that the second transmitter is located in or on the vehicle.

5. The apparatus according to claim 4, characterized in that the second transmitter is located at the site of the first receiver.

6. The apparatus according to claim 4, characterized in that the second transmitter is activated by the first transmitter.

7. The apparatus according to claim 6, characterized in that the second transmitter is activated by the first code signal sent out by the first transmitter.

8. An anti-theft apparatus for a vehicle, the vehicle having at least a lock comprising:
   a first transmitter means, located outside of the vehicle transmitting a first coded signal, and
   receiving means in said vehicle for receiving transmission of a signal, a second transmitter means transmitting a second signal which is transmitted with said first signal and which has a transmission orientation different from that of the first transmitter so that, when the first transmitter is oriented to said receiver, the signal from the second transmitter is not oriented to said receiver and is subsequently overlapped with said first coded signal,
   said receiver means in said vehicle actuating the lock only when the receiver receives the first coded signal and not when the receiver receives the signal or the second signal overlapped with said first signal, and wherein said receiver means includes:
   memory means storing a first coded signal and first comparing means electrically connected to said memory means comparing received signals with said stored first coded signal and generating a first output signal when a received signal is identical to said first coded signal and lock actuating means responsive to said first output signal to actuate said lock.

9. An anti-theft apparatus in accordance with claim 8, wherein the second signal transmitted by the second transmitter is a second coded signal, the apparatus further comprising
   second receiver means in said vehicle receiving signals,
   second memory means storing a second coded signal,
   said second receiving means also comprising second comparing means electrically connected to said second memory means comparing received signals with said stored second coded signal to produce a second output signal when a received signal is identical to said second coded signal, and
   said lock actuating means responsive to the first and second output signals to actuate said lock.

10. An anti-theft apparatus in accordance with claim 8, further comprising
    means electrically connected to and operable in response to a signal from said receiver means to actuate said second transmitter means to generate said second signal.

* * * * *